United States Patent [19]
Webb

[11] 4,172,340
[45] Oct. 30, 1979

[54] WORK HOLDER FOR GRINDER

[76] Inventor: James E. Webb, 16818 Fonthill Ave., Torrance, Calif. 90504

[21] Appl. No.: 893,073

[22] Filed: Apr. 3, 1978

Related U.S. Application Data

[63] Continuation-in-part of Ser. No. 757,313, Jan. 6, 1977, abandoned.

[51] Int. Cl.² ............................................. B24B 19/00
[52] U.S. Cl. .................................... 51/218 R; 51/225
[58] Field of Search ............ 51/217 A, 217 R, 218 R, 51/218 A, 225, 94 CS

[56] References Cited

U.S. PATENT DOCUMENTS

| | | | |
|---|---|---|---|
| 2,647,352 | 8/1953 | Lamberty | 51/225 |
| 3,094,821 | 6/1963 | Eckert | 51/217 R |
| 3,512,309 | 5/1970 | Grieco | 51/218 R |

Primary Examiner—Harold D. Whitehead
Attorney, Agent, or Firm—Howard L. Johnson

[57] ABSTRACT

Apparatus based on right-angle socket adapted to hold therein either square or round shank of workpiece for grinding faces of latter in diverse arcuate and/or planar patterns. Setting requires use of only two adjustments, each effected with great and easily reproducible accuracy: (a) by slide track for radial displacement of socket from axis of rock shaft (precisely measured by use of gage blocks), (b) angular rotation of socket on corner or edge axis—angular variation in either direction therefrom defines eccentricity of arc thus ground from reference arc centered on rock shaft. Thus settings for the two dissimilar edges or tail of a trepan bit are each set simply by turning the socket different degrees on its corner edge axis. Alternately, socket can be located for concentric rotation of workpiece by continuous driving shaft instead of rocking.

6 Claims, 36 Drawing Figures

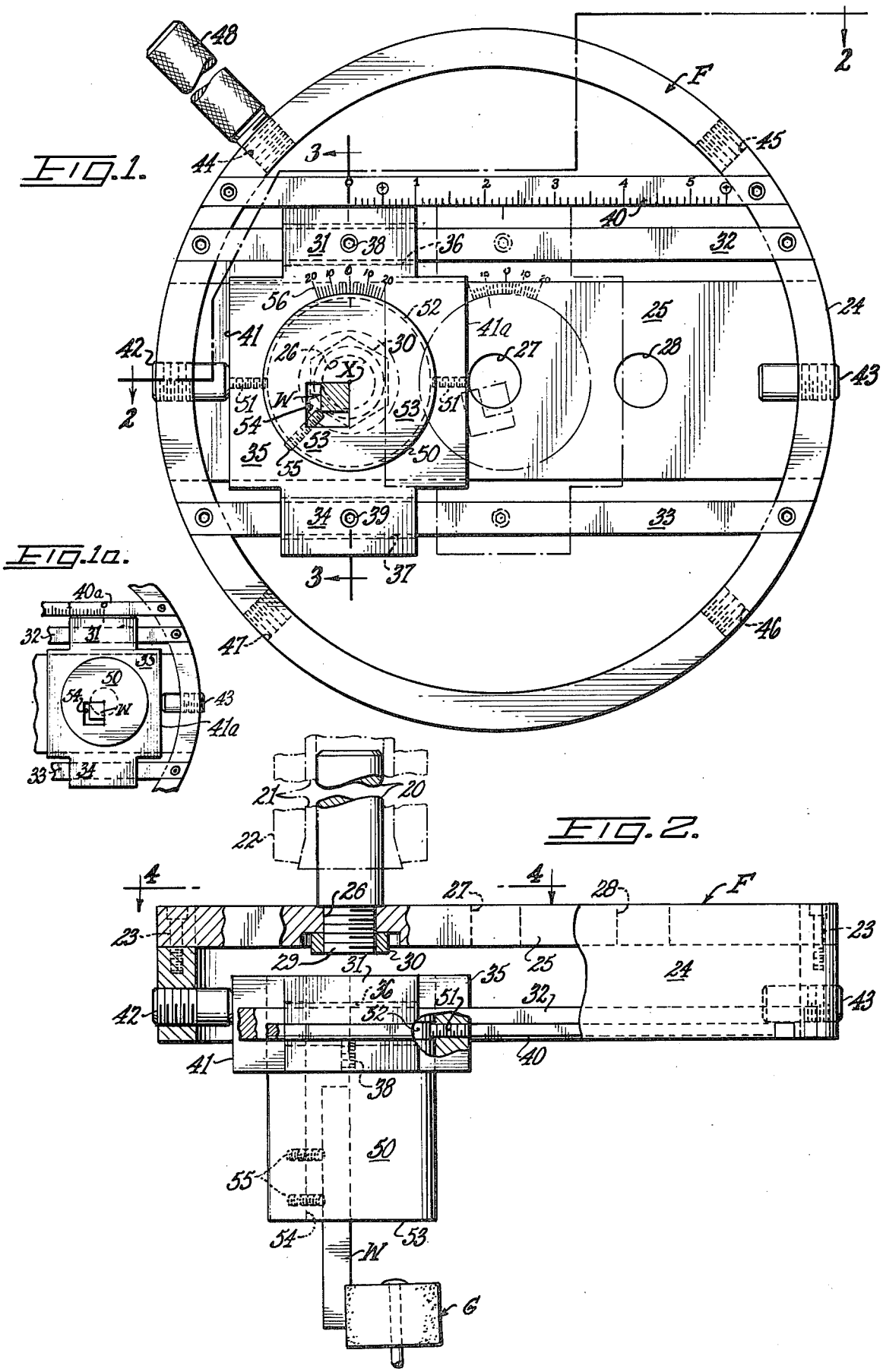

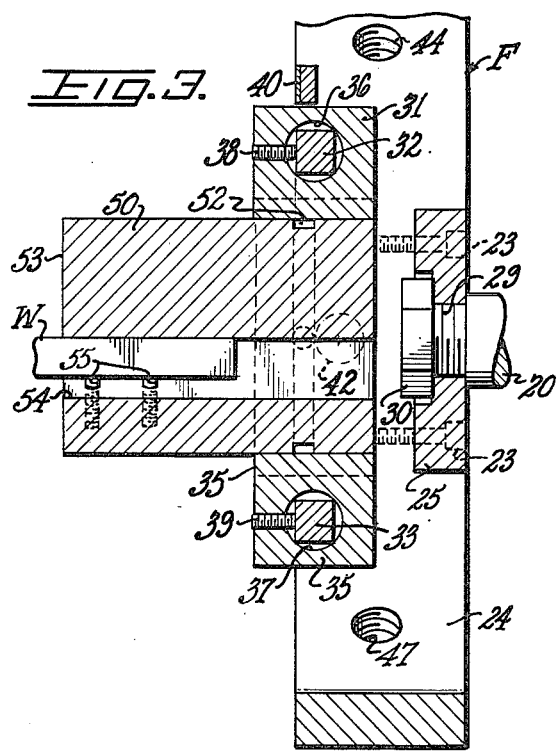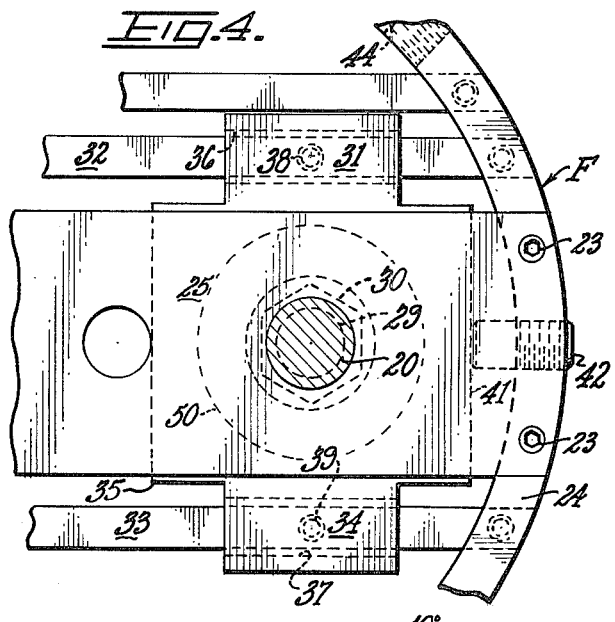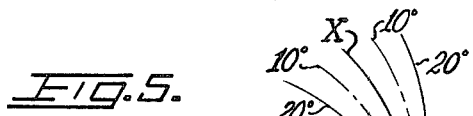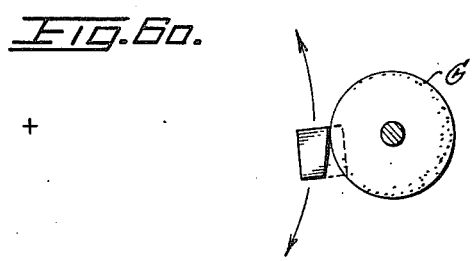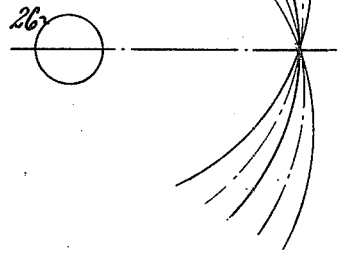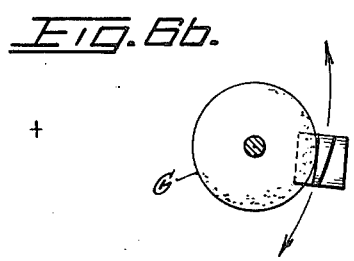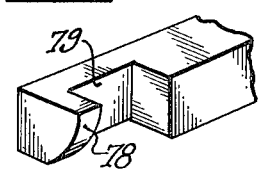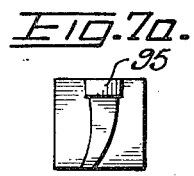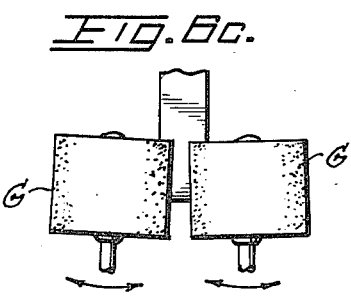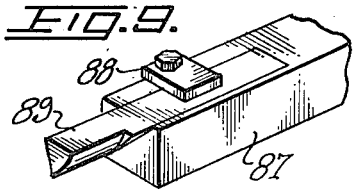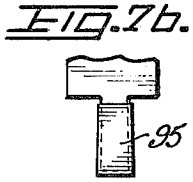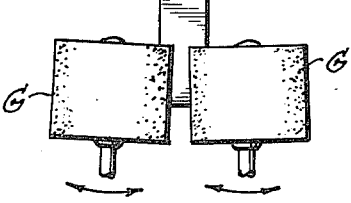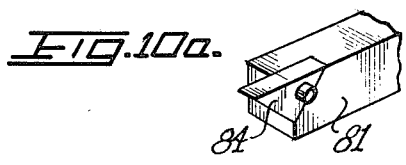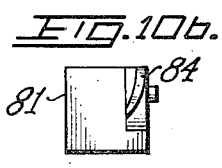

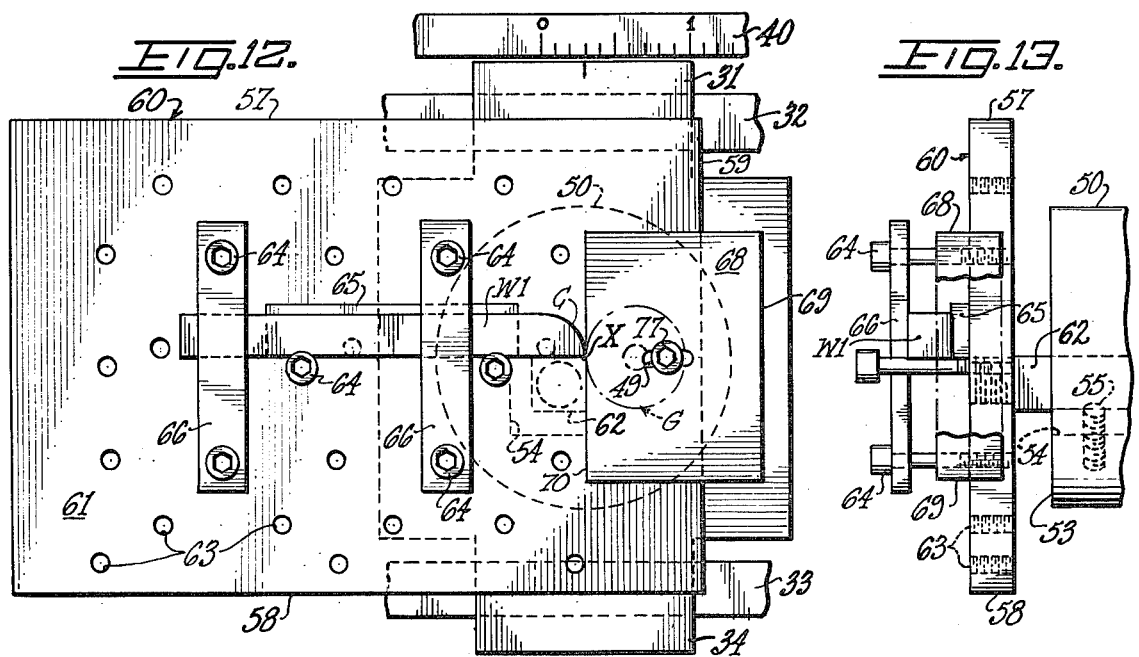

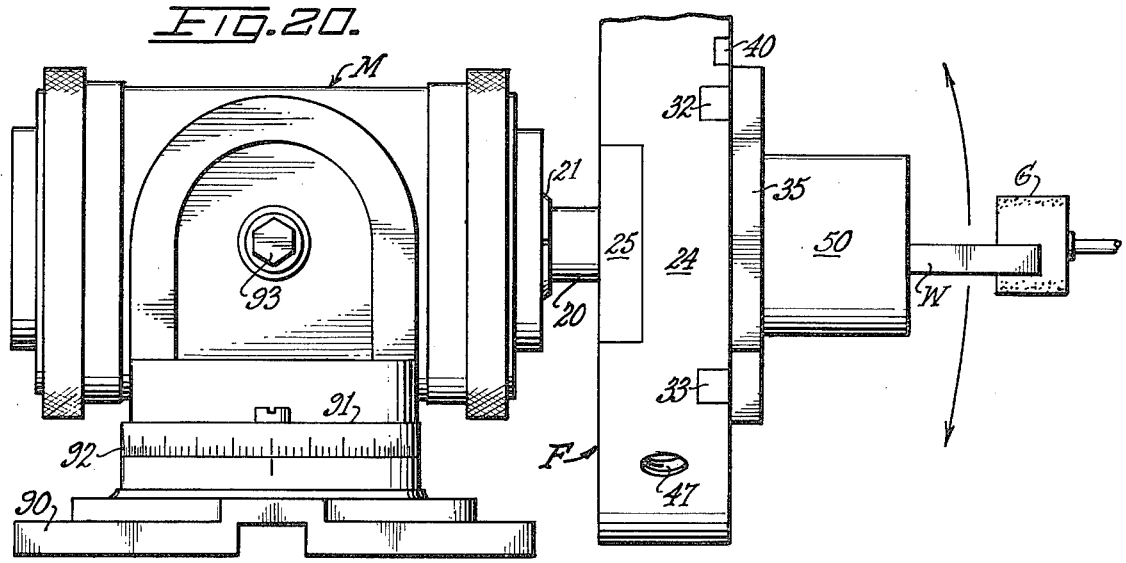
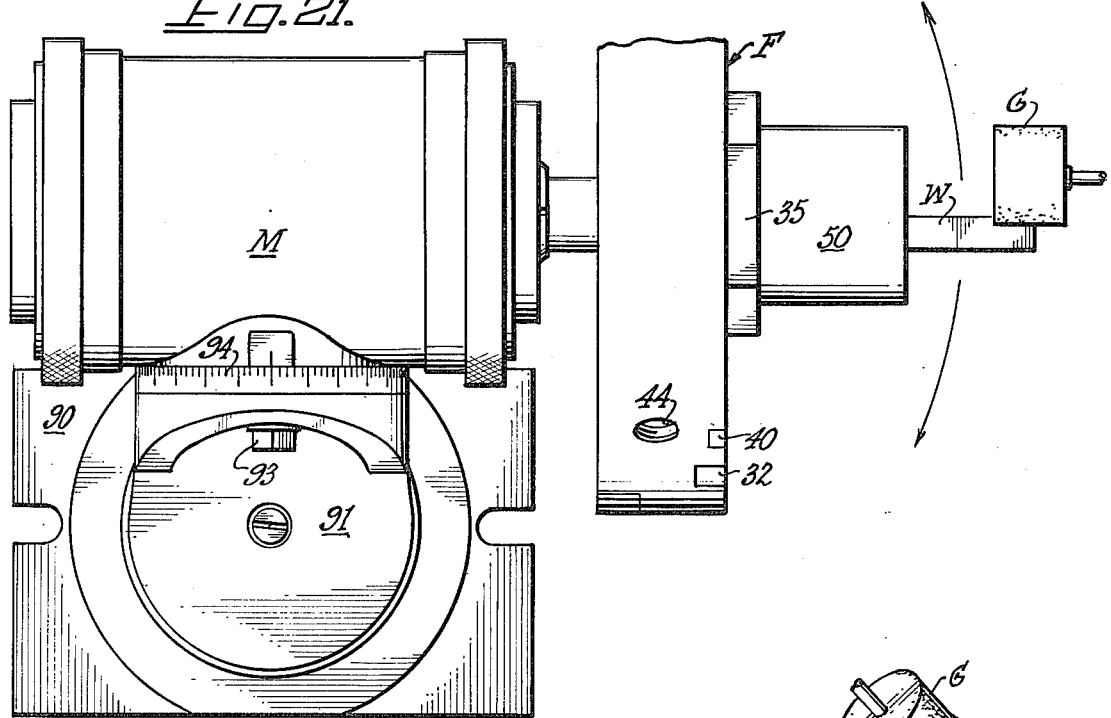
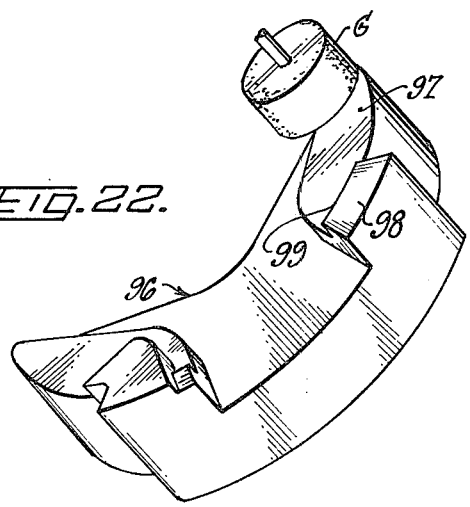

WORK HOLDER FOR GRINDER

This is a continuation-in-part of Ser. No. 757,313, filed Jan. 6, 1977, now abandoned.

BACKGROUND OF THE INVENTION

Formation of tool bits other than those of the simplest or symmetrical shapes presents the problem of getting a holding fixture to move a bit blank in such a geometric pattern relative to a grinding wheel that the latter will form a predetermined, complex configuration. Examples of such bit shapes are those having opposite or adjacent side and/or end faces of different curvature or configuration, including such tungsten carbide inserts mounted in rock bits, etc. One way to produce such uniform bit shapes is by use of interengaging cam and camways as shown in U.S. Pat. No. 2,491,346. However, use of such fixture does not allow variation from the set cam pattern. Some other fixtures permit a limited radial adjustability of a workpiece shaft relative to its rotary axis, such as seen in U.S. Pat. No. 3,094,821. In contrast, an easy and progressive adjustability for positioning such workpiece so as to obtain a calculated pattern selected from a wide range of possibilities would be highly desirable.

STATEMENT OF THE INVENTION

The present workholder provides a socket for the shank of a workpiece such as a tool bit which requires formation of lateral faces having (the same or different) curvatures, which thus-held shank is lengthwise or fanwise alignable relative to the axis of a separate grinding wheel so that the latter may act to form such successive face curvatures on the bit as it is moved relative to the grinding wheel by its socket-held bit shank being rocked or oscillated. Selective positioning of the holding socket is achieved by composite adjusting means; the thrust-insertion socket is located within and offcenter to a rotatable, cylindrical turret which is carried by a slide block. The block is displaceable transverse to a support frame which is coupled crosswise to the end of a (manually oscillatable) drive shaft. The latter may be selectively drive-connected to the frame, either concentric with the turret or offset to either side along the transverse axis of the drive shaft, that is, spaced laterally along such diametric line beyond the turret. The offcenter, typically square socket is located with one corner (forming a permanent reference point) always situated at the axis or center of the turret. Accordingly, movement of the slide block within the support frame, along the transverse axis to either side of the shaft-concentric position, thus displaces the socket and its tool bit radially to the drive shaft (for respective production of right-hand and left-hand bits). Then rotation of the turret and its offcenter socket (in any slide block position) rotates the workpiece relative to the axial reference point. Provision of correlated linear and protractor scales enables setting and resetting of the socket and workpiece to any observed or calculated position. In addition to eccentric facing of tool bits, the device may be used to position fittings for removal of particular segments, etc. Also, with the drive shaft coupled to the support frame concentric with the turret, the drive shaft may be continuously rotated (rather than rocked), and power driven if desired, so as to annularly surface a workpiece; or with concurrent axial and radial displacement, conic configuration of a workpiece is obtainable.

Further, by use of an attachment plate juxtaposed to the slide block, an arcuate series of gang bits can be simultaneously shaped.

The invention provides a work positioning socket which is rotationally adjustable on an edge axis; in the event of a square or polygonal workpiece this means that the work shank is positioned for grinding by turning it (a calculated or measured amount as by a protractor) on a pivot axis which extends along a corner of the workpiece which edge is then coincident with a corner of the socket. That is, altho the socket may be larger than the work shank, the latter is always received in this corner pivot line.

Square or polygonal bits are conventionally indexed and shaped relative to a line coaxial with or parallel to the edge of a flat side; that is, they are referenced from the corner edge. Often the forward portion which remains of the top face after grinding, forms a cutting edge. In the example of a trepan bit or groove forming tool, such as seen in FIG. 6, the two longitudinally trailing edges usually have different curvatures (when not straight). That is, the first curvature is somewhat less than the arc of a circle which is centered on the axis of the rock shaft; the second curvature is non-parallel and is relieved in the opposite direction by first angularly repositioning the workpiece. By keeping the rotational pivot point of the socket and workpiece on the initial radial (reference) line which extends out from the rock axis or shaft, successive repositioning of the workpiece for new cuts of different curvature can be made simply by angularly turning the workpiece socket as read on the protractor scale (56).

When a cylindrical workpiece is initially located in the polygonal socket adjacent the corner axis (which it obviously does not touch). FIG. 24, it is first rotated 45° for the radius line to bisect the workpiece (FIG. 25), the center of the round workpiece is then made concentric with the rock axis by moving the slide block 0.7071 x diameter of the workpiece (FIG. 26). The round workpiece may then be concentrically ground so as to form the symmetrical faces U, V (FIG. 29). It is then angularly set by turning it on the X or corner/edge axis to locate the center of an offset arc which will be round on the side of the cylindrical body as seen in FIG. 29. By then turning the work, say a quarter turn in its socket, the same arc (Y, Z) can be ground on each quadrant (or alternate quadrants) as desired.

BRIEF DESCRIPTION OF THE DRAWINGS

FIG. 1 is a vertical face view of the workholder with the slide block shown at its left-most location and a central slide position thereof indicated in phantom, the shaft of a socket-held workpiece appearing in transverse section.

FIG. 1a is a similar elevation showing in reduced size the slide block at its right-end position and a substituted left-reading mensuration scale mounted thereabove.

FIG. 2 is a staggered horizontal sectional view taken along the line 2—2 of FIG. 1, with parts broken away.

FIG. 3 is a transverse vertical sectional view taken along the line 3—3 of FIG. 1.

FIG. 4 is a rear elevational view of a portion of the holder, with the drive shaft appearing in transverse section taken along the line 4—4 of FIG. 2.

FIG. 5 is a schematic representation of the arcuate path followed by a point on the workpiece upon being arcuately tilted by rotation of the positioning turret and its workholding socket by a number of degrees in one direction or the other from the zero line X.

FIGS. 6a and 6b show a workpiece held in two such tilted, cutting positions for successively forming two opposite (nonparallel) arcuate faces, with a grinding wheel disposed adjacent a respective face.

FIG. 6c is a top view of the same, with the grinding wheel shown in both positions.

FIG. 7a is an end view of a trepan tool formed by use of the present workholder, and carrying a welded carbide insert.

FIG. 7b is a top view of the same.

FIG. 8 is a perspective view of the cutting end of an internal groove-forming bit which can be shaped by use of the present workholder.

FIG. 9 is a perspective view of a holding shank with a retained carbide bit piece, the latter having been shaped by use of the present workholder.

FIG. 10a is a perspective view of another holding shank and carbide insert before the latter has been contoured by use of the workholder and a diamond-faced grinding wheel.

FIG. 10b is an end view of the same after being shaped.

FIGS. 11a and 11b are respectively side and end views of a tool made by use of the present workholder and grinding wheel.

FIG. 12 is a face view of a mounting plate attached to the socket of the workholder and shown holding a workpiece in position for forming the end face C.

FIG. 13 is an end view of the mounted plate as seen from the right of FIG. 12.

FIG. 14 is a face view of such mounting plate centrally holding a workpiece positioned by use of a pair of adjustable parallels which locate it for formation of a semicircular end face.

FIG. 15 is a face view of such a mounting plate shown holding a series of gang bits in position for grinding all of the end faces in a composite (concave) arcuate or semicircular pattern.

FIGS. 16 and 17 are respectively face and end views of a fluted bit held on the mounting plate by a bored block, in position for grinding similar arcuate faces on successive flutes.

FIGS. 18 and 19 are perspective views of concave-ended bits which may be formed or ground by use of the present workholder.

FIG. 20 is a side elevational view of the present workholder and attached drive motor disposed on a universal swivel mount and holding a bit shank against a grinding wheel.

FIG. 21 is a top plan view of the same.

FIG. 22 is a perspective view of a casting or assembly piece, in position for removal of a particular segment by use of the present workholder and grinding wheel.

FIG. 24 is a view similar to FIG. 23 but with a round shank lodged adjacent the X-corner of the polygonal socket, such X-axis being concentric with the rock shaft.

FIG. 25 shows the turret and socket rotated 45° from the position of FIG. 24 so as to align the protractor scale with the linear index scale of the slide block.

FIG. 26 shows the slide block and socket of FIG. 25 displaced linearly (by 0.7071 workpiece diameter) so as to locate the center of the round workpiece coaxial with the rock shaft for concentric grinding.

FIG. 27 shows the turret turned 10° on the X-axis so as to position the round workpiece for grinding clearance.

FIG. 28 shows the workholder frame-carried components at the end of a quarter turn rotation against the grinding wheel as the latter is surfacing an eccentric arc (similar to Y or Z of FIG. 29) upon the side of a cylindrical workpiece.

DETAILED DESCRIPTION OF PREFERRED EMBODIMENT

Figure 23:
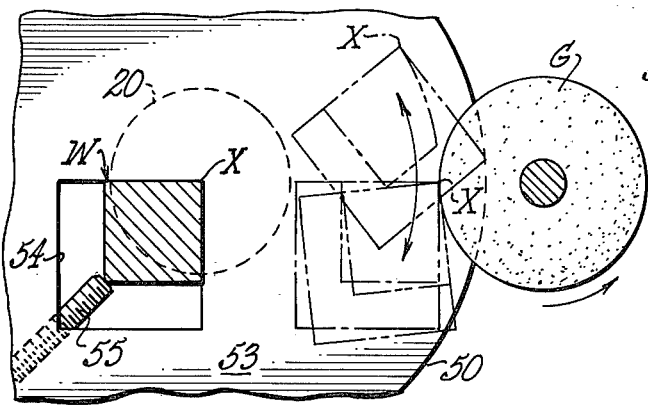
FIG. 23 is a diagrammatic representation of a square workpiece (in transverse section) located in the polygonal socket with its corner pivot axis concentric with the axis of the turret and rock shaft and (in phantom) successive positions arrived at when the socketed workpiece is moved radially, then rotationally turned on its edge axis, then arcuately reciprocated against the grinding wheel by movement of the rock shaft.
Figure 24:
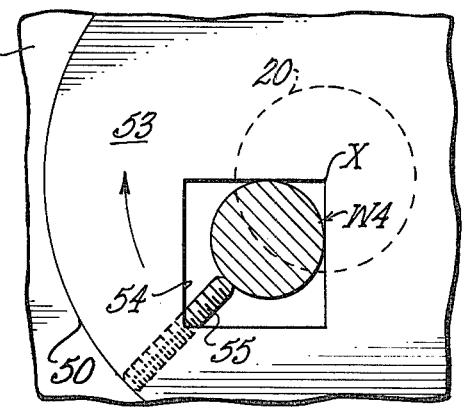
FIGS. 24–28 illustrate successive steps by which the edge rotatable socket is used to position for grinding, a round body or cylindrical workpiece such as the end mill cutter of FIGS. 29–30.
Figure 25:
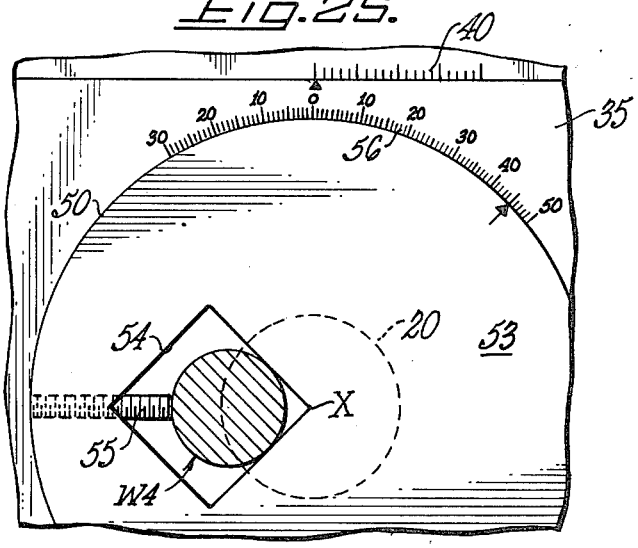
Figure 26:
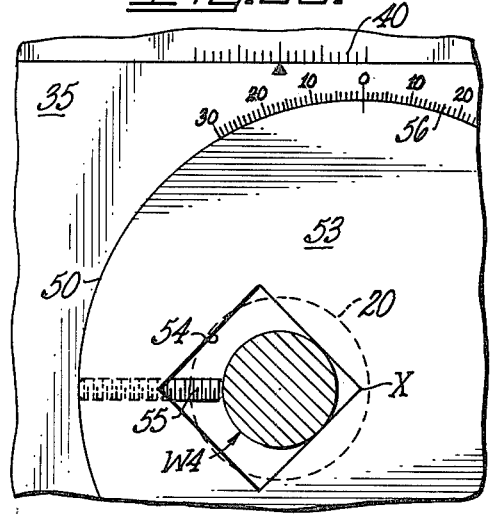
Figure 27:
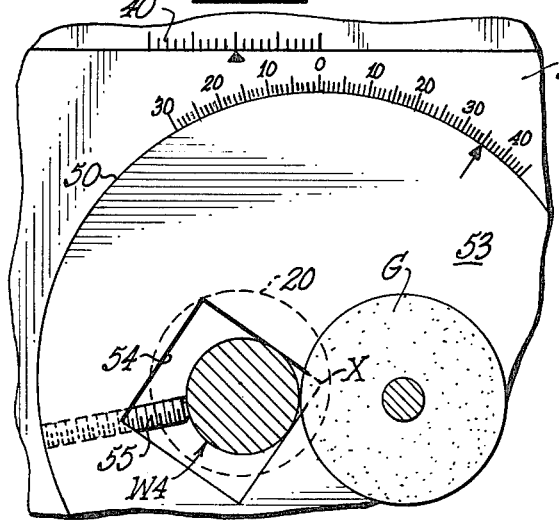
Figure 28:
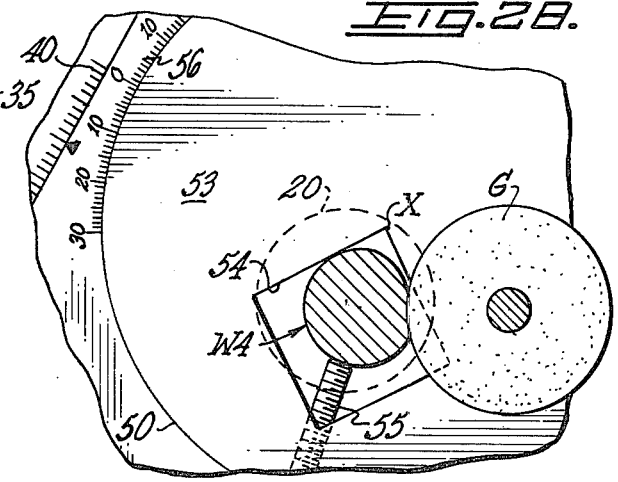
Figure 30:
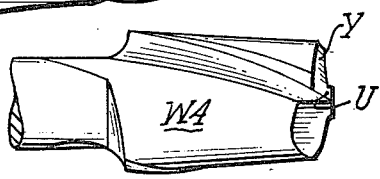
FIG. 30 is a longitudinal elevational view of the end mill cutter of FIG. 29.
Figure 29:
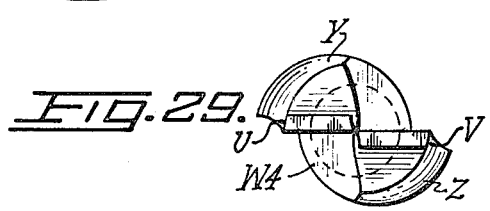
FIG. 29 is an end view of a two fluted end mill cutter having a round shank, with an enlarged cutting head bearing an opposing pair of eccentric arcuate facings Y and Z such as may be surfaced by positioning the workholder components according to FIGS. 24–28.

As seen particularly in FIGS. 1–4, the work holder has a rock or drive shaft 20 disposed with its proximate end held in a collet 21 and holder 22 which may form part of a lathe, or the shaft may be permanently journalled in a standard (FIG. 20) which provides a universal joint or swivel mounting so as to be adjustable relative to a grinding wheel with which it is used. The forward end of the shaft carries an upstanding support frame F, conveniently shaped as a cylindrical ring or tube 24 formed with a rear diametric wall 25 attached by screws 23 and having a transverse series of threaded apertures 26, 27, 28, spaced apart along a diametric line of the tube 24. A reduced and threaded end 29 of the shaft 20 (FIG. 3) is receivable in any selected one of the apertures and fixedly secured to the frame by a lock nut 30.

Adjacent the forward face of the tube 24 are a parallel pair of chordal slide rails 32, 33, laterally spaced apart equidistant from the diameter of the tube and jointly forming a track or guideway for a generally cruciform or polygonal slide block 35, the upper 31 and lower 34 segments of which are formed with a parallel pair of transverse apertures 36, 37 (FIG. 3) which are traversed by the respective slide rails. A pair of set screws 38, 39, is perpendicularly mounted in the slide block segments in position to terminally bear against the respective slide rail so as to anchor the block at a desired work-holding position. At each end of the slide track is an inward-projecting stop or abutment pin 42, 43, which threadedly traverses the tube 24.

Abutment of the inner end of the pin 42 with the parallel side wall 41 of the slide block, locates the center X of the block (which corresponds to the axis of the drive shaft 20 when the latter is secured in the left aperture 26) in line with the zero position of an index scale 40. Accordingly, displacement of the slide block 35 (and its carried workpiece W) along the track provided by the rails 32, 33 can be measured or set by reference to such scale; that is, it measures the linear offcenter or radial displacement of the point X from the axis of the drive shaft 20. Alternately, to obtain an even more minute or precise measurement of such spacing, one or more gage blocks (not shown) can be placed between the contact end of the pin 42 and the opposing abutment wall 41.

The slide block 35 is centrally bored to receive a forward-projecting, cylindrical turret 50 which is retained and locked in the block by an opposing pair of socket-headed screws 51, the inner ends of which are loosely received in an annular, peripheral groove 52 (FIG. 3) and the heads of which may be turned to effect locking engagement in the groove as by use of a socket wrench (not shown). From the forward face 53 of the turret, a retention socket 54 extends axially inward, preferably being square in cross section and provided with a diametrically directed, laterally separated, pair of socket-headed screws 55 for anchorage of a (perpendicular-sided) workpiece W in the socket. The screws 55 are thus located so as always to lodge a corner of such workpiece or shank along the axial line X which corresponds to the rotational axis of the turret 50. Accordingly, as seen in FIG. 5, if the slide block 35 carrying the turret 50 and its work-positioning socket were radially displaced from the drive shaft 20 by a given amount, and the point X of the workpiece or socket were the farthest displaced, then arcuate movement of the frame F about the axis of shaft 20 would cause the point X to follow the path of the central arc of those illustrated. If then the turret 50 and its workpiece W were set 10° or 20° to either the right or left of such position, the face ground on the (thus turned) workpiece would correspond to the shape of the particular arc as illustrated. Such a desired position can be initially set (and returned to) by reference to the protractor scale 56. For effecting oscillation of the workpiece in such arcuate path, the annular frame or ring 24 is formed with (four) radially directed, tapped sockets 44, 45, 46, 47, each of which will receive a manual operating handle 48.

In the process of forming left hand tool bits, the attachment end 29 of the drive shaft 20 is first secured in the right-most socket 28 and the slide block 35 is initially located at the right end of the slide track which is formed by the rails 32, 33, that is, with its right contact face 41a in abutment with the inner end of the positioning pin 43, the latter thus serving to align the index pointer of the upper block segment 31 with the block-displacement reference scale (40) immediately thereabove. The right-reading index scale 40 of FIG. 1 is replaced by a left-reading scale 40a (FIG. 1a) in order to read on the new scale, the amount of radial displacement from the axis of the drive shaft 20 to the new setting of the slide block, or more precisely, to a vertical line extending from the work alignment point X of the eccentric socket 54, to the perpendicular index scale 40a thereabove. The slide block is then locked in such position by the screws 38, 39. The turret 50 is then turned and anchored (by screws 51) at the required degree of rotation, to the right or the left as the case may be, as read on the protractor scale 56. The workpiece is then passed back and forth while held against a grinding wheel, as before, by manual operation of the handle 48 so as to rock the workpiece W and its supporting ring 24 on an arcuate path which is radiused from the axis of the drive shaft 20.

In some cases, the entire facing curvature may be generated with a single setting of the workholder, as with the illustrated bits of FIGS. 18 & 19. Here the respective faces A & B are each part of a true circle and therefor the X socket position is set at zero position of the index scale 40, and the grinding wheel is located within the arcuate path. Where a male facing is produced (as FIG. 6a), the wheel is located outside the arcuate path. To produce the trepan tool of FIG. 6b or FIG. 7a, the wheel must be used both inside and outside the arcuate path, turret 50 of the slide block 35 being differently set for each facing. In some cases, one uses a holding shank 81, 87 which is inserted into the socket 54 and has its free end formed with a nesting recess and fastener to hold a tungsten carbide insert 84, 89 (FIGS. 9 & 10). While the curved face 78 is made by arcing the workholder, the groove 79 results from planar support of the workpiece relative to the grinding wheel; similarly with the FIG. 11 tool.

FIGS. 12-17 show a transverse, work-support plate 60 disposed parallel to and spaced outward from the forward face 53 of the turret 50 by means of a dependent, perpendicularly extending, square contoured shaft 62, which is inserted and securely retained in the socket 54 by use of the diagonal holding screws 55. Such plate is formed with a considerable number of transverse, tapped apertures 63, arranged in longitudinal rows which are parallel to the longitudinal edges or axis of the plate. Each of the apertures will threadedly receive a socket-headed bolt 64, which bolts collectively serve both to space and to attach an elongated workpiece W1 in juxtaposition with a flat-faced spacer 65 which thus is held sandwiched behind the workpiece and in frictional registration with the forward face 61 of the plate. Selected bolts 64 may be used to fasten straps 66, 67 overlying a workpiece.

Various auxilliary work-position means may be used with the support plate 60. A spacing and locator plate 68 is provided for temporary attachment along the end margin of the support plate, being formed with a dependent ledge 69 which is disposed to abut the end face 59 of the support plate so as to locate its opposite edge 70 on the axial point X, or alternately, a measured distance to the right, a shift made possible by a bolt 77 and slideway 49.

Further positioning of a longitudinal edge of the workpiece W2 is possible by use of a pair of parallel slides 72, 74 having complementary-angle contact edges 73, 75. The lower edge 76 is thus held parallel to the bottom edge 58 of the support plate 60 by the lower row of bolts. In the example of FIG. 14, the upper edge 71 then supports the elongated workpiece W2 with its longitudinal axis coincident with a line which extends through the socket point X and through the axis of the grinding wheel G so as to generate the continuous curvature C1, C2. Alternatively, with the workpiece W1 of FIG. 12, the upper slide 72 could be moved rightward sufficiently to locate the lower edge of W1 along the longitudinal axis of the plate 60, which also goes through the point X and the axis of the wheel G. The curvature C would thus be ground.

The curvatures generated by the settings of FIGS. 12 and 14 are radiused from the axis of the drive shaft 20 which is disposed perpendicular to the zero position of scale 40, the point X being set radially outward therefrom. In contrast, for the path P of FIG. 15, the point X is in vertical alignment with the zero reading, that is, it lies on the extended axial line from the drive shaft 20.

FIG. 15 shows a series of gang bits 80 secured against the support face 61 by an overhanging pair of end-bolted straps 82, 83, with their "cutting ends" arranged in an arcuate grinding path P which is radiused from axial point X and therefor disposed for surfacing in such pattern of curvature upon oscillation of the frame F relative to a grinding wheel. In subsequent use of such bits (which are often used individually), one or more by itself may become worn or dull. It can be returned to its original place in the composite pattern on the support plate and its initial surface configuration thus reground.

In FIGS. 16–17, a longitudinally bored, holding block 85 is bolted to the support face 61 so as to position the cylindrical shaft of a fluted millcutter W3 therealong, anchored by screws 86 in position to allow the grinding wheel to generate the curvature C3 when the flute is disposed in the position shown in FIG. 17. Subsequently, upon loosening the attachment screws 86, the shaft can be rotated to bring each flute, in turn, to this same work position for similar facing.

FIGS. 20–21 show the workholder coupled to an electric drive motor M by its drive shaft 20 centrally secured to the frame or ring 24 by attachment to the axial aperture 27 (FIG. 1). By such connection, the workpiece W can be continuously rotated (as contrasted with manual oscillation by the detachable handle 48) against a grinding wheel G, thus producing a 360° grind pattern. A base or standard 90 holding the motor provides universal adjustability similar to a ball and socket joint, by way of a generally horizontal, swivel table 91 with corresponding index scale 92, and a transverse spindle 93 with its appurtenant index scale 94. It will be appreciated that such universal adaptability may be associated with either the grinding unit or the workholder assembly, but one or the other should possess such manuverability in order initially to angularly position the shaft or rotational axis of the workpiece relative to the axis or contact face of the grinding wheel, and secondly, to locate the desired contact face of the arcuately-movable workpiece (in particular such opposing lateral faces as are seen in the finished bits of FIG. 6b, FIG. 7a and FIG. 10b) successively adjacent different sides of the grinding wheel.

FIG. 22 shows an irregular fitting or casting 96 which requires removal of the planar area 97, such finished area to be lower than a required-remaining ledge or platform 98. In such case, the fitting cannot simply be held against a grinding surface which may be positioned to mill the whole casting to this lower level. However, by use of the work support plate 60 attached to the socket 54, the fitting 96 can be oscillated for the edge of the grinding wheel G to follow the curvature 99, with its end face thus sweeping over the area 97 and reducing it the required amount. Without the adjustability of the present workholder, such casting would have to be held against the grinding wheel manually, or else a special holder be formed which would then be limited to positioning this particular fittingg 96.

I claim:

1. A workholder adapted to functionally align a workpiece with a grinding wheel for grinding a predetermined pattern of surface configuration thereupon, said workholder comprising in combination:

a rotary drive shaft and a transverse work support member having means for selective functional attachment of the drive shaft both centrally and offcenter thereto for at least partial rotation of the support member in an arcuate path, said member having track means disposed transverse to the axis of said drive shaft and extending along a plane diametric to said arcuate path, a slide block selectively movable along said track means and anchorable at chosen positions therealong, concentric with said drive shaft or alternately radially displaced along the diametric plane to either side thereof, said slide block carrying an annular element rotatable on an axis transverse to the diameter of said arcuate path, said axis being selectively disposed parallel to or coaxial with said drive shaft, said element having eccentric socket means of polygonal shape, an outward extending corner of which is located on said axis of said annular element, which socket means thus is adapted to rotate a retained workpiece about said corner axis regardless of the position of radial displacement of the slide block along the diametric plane, whereby a workpiece supported by said socket means in arcuate sliding registration with a rotatable grinding wheel, may be surface configured by arcuate movement of the support member to produce a predetermined pattern of configuration resultant jointly from the rotational setting of the annular element and its socket means and location of the slide block diametric to the arcuate path.

2. A workholder according to claim 1 wherein said drive shaft and frame are mounted on swivel means adapted to locate the distal end of a workpiece which is proximately held by the socket means, alternately in position for contouring an end face and lateral faces thereof.

3. A workholder according to claim 2 which is adapted to locate said distal face for contouring selectively in a concave or convex pattern.

4. A workholder according to claim 1 which additionally includes auxilliary work attachment means comprising a support plate carried by a perpendicular shaft receivable in said socket means and adapted to be temporarily coupled thereto and having means for attaching one or more elongated workpieces adjacent a face of the plate in position for grinding a terminal segment thereof.

5. A workholder according to claim 4 wherein said support plate has attachment means for holding a consecutive series of gang bits therealong in position for joint facing of their adjacent end faces in a continuous arcuate pattern.

6. A workholder according to claim 1 wherein said polygonal socket means has means for securing the cylindrical shank of a workpiece therein.

* * * * *